United States Patent [19]
Root et al.

[11] 3,712,693
[45] Jan. 23, 1973

[54] MULTIPLE STAGE THRUST BEARING

[75] Inventors: Lawrence E. Root, Jamesville; William J. Derner, Manlius; Harold E. Stewart, Central Square, all of N.Y.

[73] Assignee: Rollway Bearing Company, Inc., Syracuse, N.Y.

[22] Filed: April 22, 1971

[21] Appl. No.: 136,413

[52] U.S. Cl. ................................................308/231
[51] Int. Cl. ...............................................F16c 19/10
[58] Field of Search..............308/231, 230, 227, 228

[56] References Cited

UNITED STATES PATENTS 2,374,820  5/1945  Raye ....................................308/231

Primary Examiner—Milton Kaufman
Assistant Examiner—Frank Susko
Attorney—Bruns & Jenney

[57] ABSTRACT

An improved multiple stage thrust bearing having a plurality of sets of thrust plates, all of the plates having controlled spring rates and being cantilever mounted to deflect under a thrust load. A roller complement is carried between the opposing faces of each thrust plate set, and a plurality of thrust transmitting ring members are located between all adjacent pairs of rotating and stationary thrust plates, to carry a portion of the load applied to the plates. In the bearing, preferentially selected elastic materials, predetermined design ratios, and congruency of load-deflection characteristics of the thrust plates and sleeves are utilized to achieve controlled displacement ratios at all bearing stages and to establish a predictable thrust bearing fatigue life.

1 Claim, 2 Drawing Figures

INVENTORS.
LAWRENCE E. ROOT,
WILLIAM J. DERNER, &
HAROLD E. STEWART

BY Bruns + Jenney

ATTORNEYS

MULTIPLE STAGE THRUST BEARING

BACKGROUND OF THE INVENTION

This invention relates generally to anti-friction thrust bearings, and has particular reference to a novel multistage or tandem thrust bearing having a controlled ratio of displacements within each stage, and between all stages, whereby a predictably satisfactory bearing fatigue life can be achieved.

As is known in the art, if the volume of an available envelope for a bearing is examined in terms of bearing capacity, a thrust bearing with a multi-stage roller arrangement offers no advantage over a single stage, large outside diameter thrust bearing. However, if it is desired to maintain as small an outside diameter as possible for the envelope, a thrust bearing with multi-stage arrangement offers considerable advantages in terms of capacity over a single stage bearing of the same outside diameter.

A multi-stage thrust bearing of the type contemplated by the present invention is disclosed in U.S. Pat. No. 2,374,820, issued May 1, 1945 to H. E. Kaye and owned by the assignee of this invention. In such bearings, studies over a period of 25 years on a large number of cases of normal and abnormal fatigue life have provided substantive evidence that arbitrary combinations of: (a) roller complement, (b) thrust plate configuration, and (c) supporting surface diameters are insufficient to insure a predictably satisfactory bearing life. Thus, while many different design combinations and configurations have been suggested, it has been found that, in general, multistage roller thrust bearings have been designed for maximum capacity without any, or at best insufficient, consideration of critical dimensions for either plate external supporting surfaces or plate separating sleeves (viz. thrust transmitting ring members). In addition, in previous designs of these bearings insufficient cognizance was given the fixity or the specific clamping and/or supporting influence, of the thrust plates and the separating sleeves.

SUMMARY OF THE INVENTION

The multi-stage thrust bearing of the invention is derived from a unique combination of components (a), (b) and (C) aBove, and results in predictable performance as well as satisfying the desired capacity. The design criteria that have been developed are based upon classical elasticity theory modified, as dictated, by physical testing and actual performance, and these criteria must be adhered to closely to insure theoretical bearing life.

To insure theoretical bearing fatigue life, the cooperating cantilever mounted thrust plates for each roller assembly must possess complementary load-deflection characteristics or spring rates. The size of the roller itself is dictated by the required bearing impressed load range, and the primary thickness of each thrust plate is selected for the rolling element diameter to achieve the desired spring rate. The thrust plates are non-rectangular in cross section, and because the shaft-mounted and the housing-mounted plates have different deflection modes, the secondary or varying thickness of each plate is designed to provide cooperating deflection of the surfaces at the contact areas of each roller assembly under load. Plate load-deflection characteristics embody the concept of mutually cooperating thrust plate slopes at the roller contact areas; said slopes being approximately equal between cooperating thrust plates, for all pairs of plates in the bearing. Since either shaft or housing-mounted plates have their deflection modes uniquely defined by the fixity of said plates, great importance is attached to this fixity (viz. plate support and clamping features). The design of the internal sleeves is also of great importance in effecting proportioned load sharing between all stages of the multi-stage bearing. Thus, in the same sense that cooperating thrust plates must have their spring rates preferentially proportioned, the separating sleeves must likewise possess prescribed spring rates, as will be explained in more detail hereinafter. The proportioning of the shoulder height of the thrust plate interfacing with a sleeve is also essential in achieving the required degree of fixity.

DESCRIPTION OF THE PREFERRED EMBODIMENTS

Figure 1:
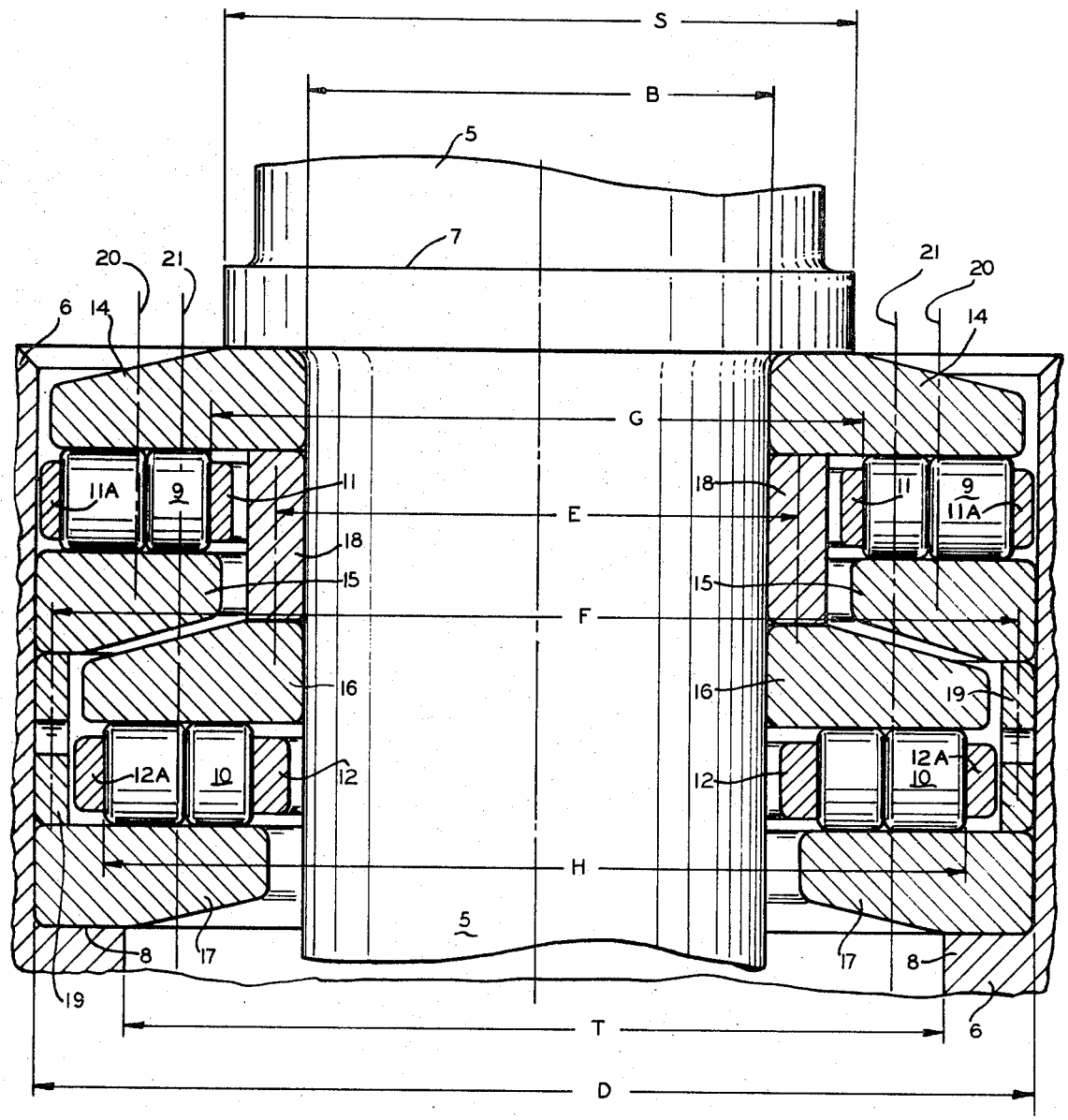
FIG. 1 is a vertical sectional view of a two stage thrust bearing embodying the invention.

Having reference now to FIG. 1, a rotating thrust member in the form of shaft 5 is mounted in a stationary housing 6 supported by or forming a part of a particular machine or apparatus. The multi-stage bearing is positioned between shoulders 7 and 8 on the shaft and housing, respectively, and includes two axially spaced anti-friction member complements in the form of sets of rollers 9 and 10 annularly disposed about the shaft. Rollers 9 are retained by a cage member 11, together with a cooperating retaining ring 11A, while rollers 10 are retained by cage member 12 and retaining ring 12A.

The rollers 9 are engaged by an upper, shaft-mounted thrust plate 14 and a lower, housing-mounted thrust plate 15. Similarly, rollers 10 are engaged by shaft-mounted plate 16 and housing-mounted plate 17. The plate 14 thrusts against the shaft shoulder 7 and plate 17 thrusts against the housing shoulder or seat 8. The other shaft-mounted plate 16 also thrusts against shaft shoulder 7 through a shaft-mounted compression sleeve 18 and plate 14, and in like manner housing-mounted plate 15 thrusts against housing shoulder 8 through a housing-mounted compression sleeve 19 and plate 17.

The thrust load is transmitted from shaft shoulder 7 to the housing shoulder 8, with respect to a downward direction of thrust, through the thrust plates, rollers and compression sleeves in two paths as described in U.S. Pat. No. 2,374,820, referred to above. One of these paths is from plate 14 to rollers 9, plate 15, sleeve 19 and plate 17. The other path is from plate 14 to sleeve 18, plate 16, rollers 10 and plate 17.

In order to obtain the desired deflection of the thrust plates, plates 14, 15, 16 and 17 are non-rectangular in cross section being thinner at their unsupported peripheries. Thus, to achieve theoretical bearing fatigue life, the two cooperating thrust plates for each roller complement of the multistage bearing must possess proportioned spring rates (viz. load-deflection characteristics). This precludes uneven load distribution in the mutual contact area of the rollers and plates. The shaft-mounted thrust plates have a deflection mode analogous to either a centrally clamped washer as in 14, or a centrally supported washer as in 16, both with free outside perimeter; and the housing-mounted plates have a deflection mode analogous to either a washer clamped at its outside edge as in 17, or an outer-edge supported washer, as in 15, with a free inside perimeter. Because of these modae differences the cross section of each plate will have a unique configuration.

In the cylindrical roller multi-stage thrust bearing of the invention, conventional and specialized design parameters are employed to define the optimum configuration of the bearing. Since capacity is normally of prime importance, this will dictate the diameter of the rollers 9 and 10. The primary thickness of each of the thrust plates 14, 15, 16 and 17, located next to plate mounting surface, is proportioned to the roller diameter to achieve a compromise between an unduly stiff spring system with undesirably small elastic plate deflections and an unduly weak spring system with large deflections which would have accompanying excessive plate bending stresses. The secondary or varying thickness of each plate is, as indicated above, defined to effect identical deflection curve surfaces at the contact areas of each roller assembly, when loaded.

The effective mean thickness of both shaft and housing-mounted thrust plates must be determined, and in every case this is a function of the applied load and the peripheral radii of the roller complement associated with each pair of plates. In this connection, it can be seen from FIG. 1 that the pitch diameters, indicated by broken lines 20 and 21, of the sets of rollers 9 and 10, respectively, decrease from the initial to the terminal stage of the bearing to satisfy design requirements. Because the deflection modes of the shaft-mounted and housing-mounted plates are different, as noted above, their effective mean thicknesses will be different, and it is essential that the ratio of the mean thickness of a housing-mounted plate to the mean thickness of its cooperating shaft-mounted plate be selected to produce equal deflection slopes.

In achieving proportioned load sharing between all stages of the bearing, the design of the compression sleeves 18 and 19 is of prime importance. Thus, just as cooperating thrust plates must possess proportioned spring rates, all sleeves must possess a prescribed spring rate. In the two stage bearing of FIG. 1, the spring rates of the shaft-mounted and housing-mounted sleeves are proportional to the individual capacities of each of the sets of rollers. To insure uniform load distribution in the contact areas, it is also important to have proper configuration of the plate supporting surfaces. Specifically, the annular areas of the shaft and housing shoulders 7, 8 should comply with bearing design parameters selected, and should be coextensive with the flat surfaces of thrust plates 14 and 17 in engagement therewith.

In addition to the requirements for the plate supporting surfaces, certain of the supporting diameters within the bearing are determined according to special design parameters. Thus, the interior bearing structure referred to is designed to complement the effective mean thicknesses derived for the thrust plates and to achieve the required deflection curve. There are four such special parameters for the two stage bearing of FIG. 1 expressed as ratios as follows:

$$S/E = 1.00 - 1.30 \tag{1}$$

where $S$ is the diameter of shaft shoulder 7, and $E$ is the mean diameter of the shaft-mounted compression sleeve 18, $$S/G = 0.90 - 1.10 \tag{2}$$

where $G$ is the inside diameter of the set of rollers 9.

$$T/F = 0.80 - 1.00 \tag{3}$$

where $T$ is the inside diameter of the housing shoulder 8, and $F$ is the mean diameter of the housing-mounted compression sleeve 19.

$$T/H = 0.90 - 1.10 \tag{4}$$

where $H$ is the outside diameter of the set of rollers 10.

Figure 2:
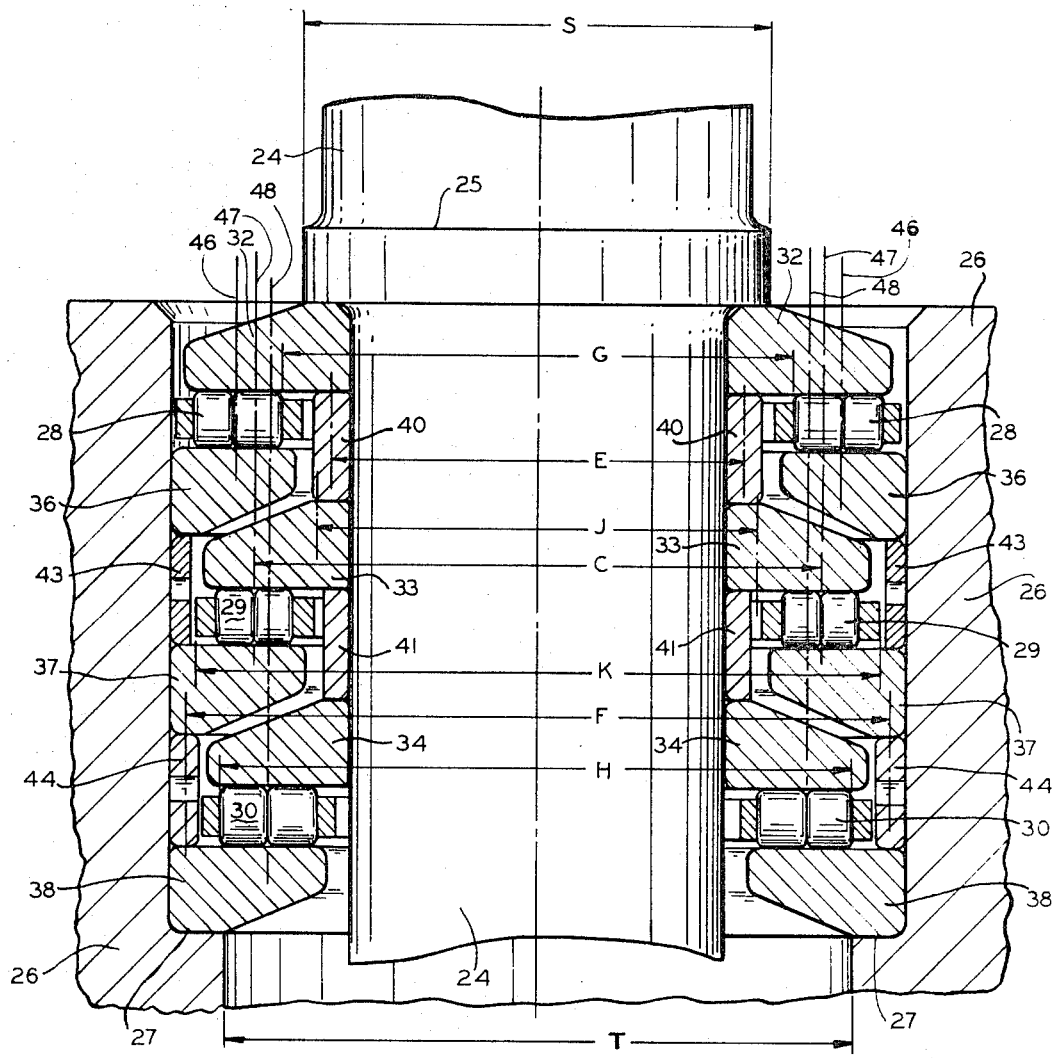
FIG. 2 is a vertical sectional view of a three stage thrust bearing embodying the invention.

FIG. 2 illustrates a three stage thrust bearing constructed essentially like the bearing of FIG. 1 but with one additional stage. In this bearing, a shaft 24 having a shoulder 25 is mounted in housing 26 having a supporting shoulder 27. The anti-friction members comprise three sets of rollers 28, 29 and 30, respectively engaged by upper, shaft-mounted thrust plates 32, 33 and 34 and lower, housing-mounted thrust plates 36, 37 and 38. There are two shaft-mounted compression sleeves 40, 41 and two housing-mounted compression sleeves 43 and 44.

In the three stage bearing the design criteria is the same as that described above for the two stage bearing with two additional special design parameters. These parameters, expressed as ratios, are as follows:

$$S/E = 1.00 - 1.30 \tag{1}$$

where $S$ is the diameter of shaft shoulder 25, and $E$ is the mean diameter of the shaft-mounted sleeve 40.

$$S/G = 0.90 - 1.10 \tag{2}$$

where $G$ is the inside diameter of the set of rollers 28.

$$T/F = 0.80 - 1.00 \tag{3}$$

where $T$ is the inside diameter of housing shoulder 27, and $F$ is the mean diameter of the housing-mounted sleeve 44.

$$T/H = 0.90 - 1.10 \tag{4}$$

where $H$ is the outside diameter of the set of rollers 30.

$$J/C = 0.70 - 0.90 \tag{5}$$

where $J$ is the mean outside diameter of the shaft-mounted sleeves 40 and 41, and $C$ is the pitch diameter of the set of rollers 29.

$$K/C = 1.10 - 1.35 \tag{6}$$

where $K$ is the mean inside diameter of the housing-mounted sleeves 43 and 44.

As with the two stage bearing of FIG. 1, it will be seen from the broken lines 46, 47 and 48 that the pitch diameters of the sets of rollers 28, 29 and 30 decrease from the initial to the terminal stage of the bearing. It should also be noted that in the three stage bearing (FIG. 2) the ratio of the spring rates of sleeves 40 and 44 to the spring rates of sleeves 41 and 43 is usually approximately 2:1, while sleeves 40 and 44 usually have the same spring rate, and sleeves 41 and 43 usually have the same spring rate.

From the foregoing description, it will be apparent that the invention provides a multi-stage thrust bearing construction in which uniform load distribution and controlled load deflection result in a predictably satisfactory bearing fatigue life. As will be understood by those familiar with the art, the invention may be embodied in other specific forms without departing from the spirit or essential characteristics thereof.

We claim:

1. A multiple stage thrust bearing for transmitting a thrust load from a shaft shoulder on a rotating member to an annular shoulder on a fixed member, comprising a plurality of sets of thrust plates including at least an initial and a terminal set, each set of plates consisting of an upper shaft mounted and a lower housing mounted plate having proportioned spring rates, each of said plates having a non-rectangular cross section and being cantilevered to deflect under a thrust load, said deflection being near that ear identical thrust plate slopes exist at mutual roller contact areas, a roller complement carried between and engaged by the opposing faces of each set of thrust plates including at least an initial and a terminal complement, and a plurality of thrust transmitting ring members including at least an initial and a terminal ring member, one of said members being located between shaft mounted thrust plates and the other said member being located between housing mounted thrust plates, the thrust plates being adapted to transmit therethrough a portion of the thrust applied to said plates, the total contact area for each roller complement with said opposed thrust plate faces being essentially equal to that of every other roller complement, the predetermined ratio of the shaft shoulder diameter to the mean diameter of a ring member located between adjacent shaft mounted plates being in the range of 1.00 to 1.30, the predetermined ratio of the shaft shoulder diameter to the inside diameter of the initial roller complement being in the range of 0.90 to 1.10, the predetermined ratio of the inside diameter of the housing shoulder to the mean diameter of a ring member located between adjacent housing mounted plates being in the range of 0.80 to 1.00, and the predetermined ratio of the inside diameter of the housing shoulder to the outside diameter of the terminal roller complement being from 0.90 to 1.10.

* * * * *